(12) United States Patent
Maguire et al.

(10) Patent No.: US 10,539,366 B2
(45) Date of Patent: Jan. 21, 2020

(54) METHOD AND APPARATUS FOR VACUUM DRYING GRANULAR RESIN MATERIAL

(71) Applicants: Stephen B. Maguire, West Chester, PA (US); Michael E. Gera, Jr., Aston, PA (US)

(72) Inventors: Stephen B. Maguire, West Chester, PA (US); Michael E. Gera, Jr., Aston, PA (US)

( * ) Notice: Subject to any disclaimer, the term of this patent is extended or adjusted under 35 U.S.C. 154(b) by 458 days.

(21) Appl. No.: 14/693,951

(22) Filed: Apr. 23, 2015

(65) Prior Publication Data

US 2015/0316320 A1    Nov. 5, 2015

Related U.S. Application Data

(60) Provisional application No. 61/986,266, filed on Apr. 30, 2014.

(51) Int. Cl.
| | | |
|---|---|---|
| *F26B 3/00* | (2006.01) | |
| *F26B 3/06* | (2006.01) | |
| *F26B 17/12* | (2006.01) | |
| *F26B 17/14* | (2006.01) | |
| *F26B 25/06* | (2006.01) | |

(52) U.S. Cl.
CPC .............. *F26B 3/06* (2013.01); *F26B 17/128* (2013.01); *F26B 17/14* (2013.01); *F26B 25/06* (2013.01)

(58) Field of Classification Search
CPC .... F26B 3/14; F26B 3/16; F26B 17/00; F26B 17/001; F26B 17/12; F26B 17/14; F26B 23/10; F26B 2200/08; F26B 9/063

USPC ... 34/504, 505, 165, 167, 168, 361, 364, 92, 34/406, 408, 410

See application file for complete search history.

(56) References Cited

U.S. PATENT DOCUMENTS

| | | |
|---|---|---|
| 512,673 A | 1/1894 | Mason |
| 753,597 A | 3/1904 | Long |
| 960,857 A | 6/1910 | Eggert |
| 1,520,017 A | 12/1924 | Denton |
| 1,620,289 A | 3/1927 | Ridley |
| 1,625,451 A | 4/1927 | Brown |
| 2,161,190 A | 6/1939 | Paull |
| 2,550,240 A | 4/1951 | Geiger et al. |
| 2,569,085 A | 9/1951 | David et al. |
| 2,587,338 A | 2/1952 | Lee et al. |
| 3,111,115 A | 11/1963 | Best |
| 3,113,032 A | 12/1963 | Wayne |

(Continued)

FOREIGN PATENT DOCUMENTS

| | | |
|---|---|---|
| AU | 417596 | 6/1971 |
| CA | 1100402 | 5/1981 |

(Continued)

OTHER PUBLICATIONS

Thirty-nine page brochure entitled "Maguire Low Pressure Dryer: Sep. 7, 2000: Installation Operation Maintenance", 2000.

(Continued)

*Primary Examiner* — John P McCormack
(74) *Attorney, Agent, or Firm* — Fox Rothschild LLP (57) ABSTRACT

Method and apparatus for drying granular resin material by drawing vacuum over heating resin material in a vessel, while periodically purging the vessel with the material therein with dry air and bathing the vacuum dried material with dry air until furnished to a processing machine.

15 Claims, 1 Drawing Sheet

(56) References Cited

U.S. PATENT DOCUMENTS

| | | | |
|---|---|---|---|
| 3,115,276 A | 12/1963 | Johanningmeier | |
| 3,138,117 A | 6/1964 | Dorey | |
| 3,144,310 A | 8/1964 | Glatt et al. | |
| 3,209,898 A | 10/1965 | Beebe et al. | |
| 3,348,848 A | 10/1967 | Lucking et al. | |
| 3,470,994 A | 10/1969 | Schnell et al. | |
| 3,597,850 A | 8/1971 | Jenkins | |
| 3,628,508 A | 12/1971 | Kummel | |
| 3,630,352 A | 12/1971 | Morse | |
| 3,649,202 A | 3/1972 | Bajek et al. | |
| 3,698,098 A | 10/1972 | Ramsay | |
| 3,834,038 A | 9/1974 | Janda | |
| 3,959,636 A | 5/1976 | Johnson et al. | |
| 3,969,314 A | 7/1976 | Grigull | |
| 3,985,262 A | 10/1976 | Nauta | |
| 4,026,442 A | 5/1977 | Orton | |
| 4,108,334 A | 8/1978 | Moller | |
| 4,127,947 A | 12/1978 | Webb et al. | |
| 4,148,100 A | 4/1979 | Moller | |
| 4,219,136 A | 8/1980 | Williams et al. | |
| 4,294,020 A | 10/1981 | Evans | |
| 4,322,970 A | 4/1982 | Peter | |
| 4,347,670 A * | 9/1982 | Wear | F26B 5/041 219/748 |
| 4,351,119 A * | 9/1982 | Meunier | F26B 17/1441 34/169 |
| 4,354,622 A | 10/1982 | Wood | |
| 4,357,830 A | 11/1982 | Kohama et al. | |
| 4,364,666 A | 12/1982 | Keyes | |
| 4,394,941 A | 7/1983 | Recine | |
| 4,399,697 A | 8/1983 | Kohama et al. | |
| 4,402,436 A | 9/1983 | Hellgren | |
| 4,413,426 A | 11/1983 | Graff | |
| 4,414,847 A | 11/1983 | Kohama et al. | |
| 4,454,943 A | 6/1984 | Moller | |
| 4,475,672 A | 10/1984 | Whitehead | |
| 4,498,783 A | 2/1985 | Rudolph | |
| 4,505,407 A | 3/1985 | Johnson | |
| 4,510,106 A | 4/1985 | Hirsch | |
| 4,525,071 A | 6/1985 | Horowitz et al. | |
| 4,531,308 A | 7/1985 | Neilson et al. | |
| 4,544,279 A | 10/1985 | Rudolph | |
| 4,581,704 A | 4/1986 | Mitsukawa | |
| 4,603,489 A | 8/1986 | Goldberg | |
| 4,619,379 A | 10/1986 | Biehl | |
| 4,705,083 A | 11/1987 | Rossetti | |
| 4,732,318 A | 3/1988 | Osheroff | |
| 4,756,348 A | 7/1988 | Moller | |
| 4,793,711 A | 12/1988 | Ohlson | |
| 4,830,508 A | 5/1989 | Higuchi et al. | |
| 4,848,534 A | 7/1989 | Sandwall | |
| 4,850,703 A | 7/1989 | Hanaoka et al. | |
| 4,924,601 A * | 5/1990 | Bercaw | F26B 5/04 34/530 |
| 4,938,061 A | 7/1990 | Carp | |
| 4,952,856 A | 8/1990 | Schmitz | |
| 5,064,328 A | 11/1991 | Raker | |
| 5,110,521 A | 5/1992 | Moller | |
| 5,115,577 A | 5/1992 | Kramer | |
| 5,116,547 A | 5/1992 | Tsukahara et al. | |
| 5,132,897 A | 7/1992 | Allenberg | |
| 5,143,166 A | 9/1992 | Hough | |
| 5,148,943 A | 9/1992 | Moller | |
| 5,172,489 A | 12/1992 | Moller | |
| 5,225,210 A | 7/1993 | Shimoda | |
| 5,252,008 A | 10/1993 | May, III et al. | |
| 5,261,743 A | 11/1993 | Moller | |
| 5,285,930 A | 2/1994 | Nielsen | |
| 5,293,697 A | 3/1994 | Kawakami | |
| 5,340,241 A | 8/1994 | Thiele et al. | |
| 5,340,949 A | 8/1994 | Fujimura et al. | |
| 5,341,961 A | 8/1994 | Hausam | |
| 5,409,991 A | 4/1995 | Mitsuno et al. | |
| 5,423,455 A | 6/1995 | Ricciardi et al. | |
| 5,426,415 A | 6/1995 | Prachar et al. | |
| 5,433,020 A | 7/1995 | Leech | |
| 5,487,225 A | 1/1996 | Downie | |
| 5,501,143 A | 3/1996 | Thom, Jr. | |
| 5,513,445 A | 5/1996 | Farrag | |
| 5,594,035 A | 1/1997 | Walsh | |
| 5,651,401 A | 7/1997 | Cados | |
| 5,732,478 A | 3/1998 | Chapman | |
| 5,767,453 A | 6/1998 | Wakou et al. | |
| 5,767,455 A | 6/1998 | Mosher | |
| 5,780,779 A | 7/1998 | Kitamura et al. | |
| 5,807,422 A | 9/1998 | Grgich et al. | |
| 5,810,961 A | 9/1998 | Anderson et al. | |
| 5,843,513 A | 12/1998 | Wilke et al. | |
| 6,079,122 A | 6/2000 | Rajkovich | |
| 6,151,795 A | 11/2000 | Hoffman et al. | |
| 6,154,980 A | 12/2000 | Maguire | |
| 6,315,902 B1 | 11/2001 | Collasius et al. | |
| 6,357,294 B1 | 3/2002 | Nakada | |
| 6,449,875 B1 | 9/2002 | Becker et al. | |
| 6,584,701 B1 * | 7/2003 | Brown | F26B 17/1408 34/169 |
| 7,007,402 B1 | 3/2006 | Gillette | |
| 7,234,247 B2 | 6/2007 | Maguire | |
| 7,347,007 B2 | 3/2008 | Maguire | |
| 8,141,270 B2 | 3/2012 | Gera, Jr. | |
| 8,776,392 B2 | 7/2014 | Maguire | |
| RE45,408 E | 3/2015 | Maguire | |
| RE45,501 E | 5/2015 | Maguire | |
| 2002/0024162 A1 * | 2/2002 | Maguire | B01F 15/00805 264/40.7 |
| 2002/0092525 A1 | 7/2002 | Rump et al. | |
| 2005/0092675 A1 | 5/2005 | Nakahara et al. | |
| 2007/0234702 A1 | 10/2007 | Hagen et al. | |
| 2008/0237361 A1 | 10/2008 | Wang | |
| 2009/0059714 A1 * | 3/2009 | Pikus | F26B 17/1483 366/103 |
| 2010/0217445 A1 * | 8/2010 | Moretto | F26B 21/04 700/282 |
| 2010/0229420 A1 * | 9/2010 | Garrido | F26B 21/10 34/493 |
| 2011/0035959 A1 | 2/2011 | Gera, Jr. | |
| 2011/0106475 A1 | 5/2011 | Wigen | |
| 2011/0283554 A1 * | 11/2011 | Kuhnau | F26B 17/1408 34/79 |
| 2012/0311884 A1 * | 12/2012 | Eisinger | B01D 17/0205 34/427 |
| 2013/0014404 A1 * | 1/2013 | Bloemendaal | F26B 17/126 34/167 |
| 2014/0239533 A1 | 8/2014 | Maguire | |

FOREIGN PATENT DOCUMENTS

| | | |
|---|---|---|
| CH | 688217 | 6/1997 |
| CN | 203331276 U | 12/2013 |
| DE | 318127 | 3/1914 |
| DE | 421770 | 11/1925 |
| DE | 623000 | 6/1937 |
| DE | 3541532 | 5/1986 |
| DE | 3923241 | 1/1991 |
| DE | 4300060 | 7/1994 |
| DE | 4300595 | 7/1994 |
| DE | 4323295 | 2/1995 |
| DE | 19740338 A1 | 3/1999 |
| DE | 19842778 A1 | 3/2000 |
| DE | 102004034293 A1 | 2/2006 |
| EP | 0132482 | 2/1985 |
| EP | 0318170 | 5/1989 |
| EP | 0466362 | 1/1992 |
| EP | 0507689 | 10/1992 |
| EP | 0587085 | 3/1994 |
| EP | 0743149 | 11/1996 |
| EP | 0997695 | 5/2000 |
| EP | 1004856 A2 | 5/2000 |
| EP | 1288600 | 3/2003 |
| FR | 802618 | 9/1936 |
| FR | 2109840 | 5/1972 |
| FR | 2235775 | 1/1975 |
| FR | 2517087 | 5/1983 |

(56) References Cited

FOREIGN PATENT DOCUMENTS

| | | |
|---|---|---|
| FR | 2695988 | 3/1994 |
| GB | 479090 | 1/1938 |
| GB | 671085 | 4/1952 |
| GB | 849613 | 9/1960 |
| GB | 2081687 | 2/1982 |
| JP | 58133308 A | 8/1983 |
| JP | 58155423 A | 9/1983 |
| JP | 59082936 | 5/1984 |
| JP | 59187081 A | 10/1984 |
| JP | 59190623 A | 10/1984 |
| JP | 59204731 A | 11/1984 |
| JP | 62083622 A | 4/1987 |
| JP | 01286806 | 6/1987 |
| JP | 01235604 | 9/1989 |
| JP | 02077619 A | 3/1990 |
| JP | 02293501 A | 12/1990 |
| JP | 03020619 A | 1/1991 |
| JP | 03172716 A | 7/1991 |
| JP | 4201522 | 7/1992 |
| JP | 04278423 A | 10/1992 |
| JP | 04320946 A | 11/1992 |
| JP | 05142006 A | 6/1993 |
| JP | 06080015 A | 3/1994 |
| JP | 6114834 | 4/1994 |
| JP | 11064059 A | 3/1999 |
| JP | 2000257809 A | 9/2000 |
| JP | 2002174541 A | 6/2002 |
| WO | WO 99/15324 | 4/1999 |
| WO | WO 99/37964 | 7/1999 |
| WO | WO 01/49471 | 7/2001 |
| WO | WO 2006/002124 A1 | 1/2006 |

OTHER PUBLICATIONS

Two-sided color brochure entitled "NovaDrier N Series Dryer" published by Novatec Inc., undated.
International Search Report for PCT/US98/19464 (WO 99/15324).
International Search Report for PCT/US02/19294.
Two page two-sided color brochure entitled "LPD Series Dryers: New Directions in drying technology" of Maguire Products, Inc., Jun. 6, 2000.
One page two-sided color brochure entitled "Drying Systems: WGR Gas Dryer Retrofit" of AEC Whitlock, 1997.
Two page two-sided color brochure entitled "Drying Systems: Mass Flow.TM. Series Drying Hoppers" of AEC Whitlock, 1998.
Four page color brochure entitled "Speedryer Thermodynamic Hopper Dryer" of Canam Manufactured Products Inc., Dec. 10, 2001.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad.TM. Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries As Primary", AEC, Inc., 1999.
Two page two-sided color brochure entitled "LPD Vacuum Dryers" of Maguire Products, Inc. Jun. 6, 2000.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu.TM. Loading System" of Maguire Products, Inc., dated Nov. 12, 1996, Charlotte, NC.
One page color advertisement entitled "This little vacuum dryer can do in 40 minutes what it takes your desiccant dryer to do in 4 hours.", Plastic News dated Nov. 19, 2001.
One page color article entitled "Dryer Competition Heats Up With New Designs", Modern Plastics, Jul. 2001, p. 68.
One page advertisement of Frigomeccanica Industriale, Modern Plastics, Jul. 2001, p. 70.
16 page Low Pressure Dryer Technical Information Specifications Features of Maguire Products, Inc. dated Nov. 29, 2000.
One page article entitled "New Dryer Technologies at NPE Aren't Just Hot Air", Plastics Technology, Aug. 2000, p. 19.
One page article entitled "Tech Preview", Automatic Plastics, Aug. 2000, p. 66.
One page article entitled "Maguire expands Low Pressure Dryer commercialization" from www.specialchem.com dated Mar. 30, 2001.
One page article entitled "Smaller Resin Dryer", Plastics Engineering, Aug. 2001, p. 28.
Five page brochure entitled LPD.TM. Series Dryers of Maguire Products, Inc. dated Jan. 29, 2001.
Two page press released entitled "Maguire® LPD™ 30, Smaller Model of Breakthrough Resin Dryer, Will Make World Debut at K 2001 Show" of Maguire Products, Inc. dated Jun. 29. 2001.
Three page press release entitled "In Commercial Use by Wide Range of Plastic Processors, Maguire.RTM. LPD.TM. Resin Dryer Yields Big Savings in Energy Costs" of Maguire Products. Inc. dated May 14, 2001.
Two page press release entitled "Maguire Obtains Patent on Fundamentally New Resin Dryer and Steps Up Program for Worldwide Commercialization" of Maguire Products, Inc. dated Dec. 18, 2000.
Six page press release entitled "Fast, Low-Cost Process Transforms Resin Drying, Promising Dramatic Advance in Industry Productivity and Quality" of Maguire Products, Inc. dated Jun. 20, 2000.
Two page press release entitled "New-Concept Resin Dryer Enables Custom Molder to Eliminate Reject Parts—and Once More Enjoy Sunday Evenings" of Maguire Products, Inc. dated Jun. 20, 2000.
One page color article entitled "Maguire LPD unit nets positive marks", Plastic News, Oct. 3, 2001, p. 3.
International Search Report for related application No. PCT/US2005/021851.
Five page Written Opinion of the International Searching Authority dated Sep. 29, 2005 in connection with International Patent Application No. PCT/US2005/021851.
Eight page European Search Report dated Sep. 23, 2005 in connection with European Patent Application No. EP05076911.
Maguire Products' in Brazilian Plastics—World Plastic News , "Maguire introduces new vacuum resin dryer based on gravity flow", Dated Mar. 22, 2013., "Expo Plast", 8th Fair of Suppliers for the Plastics Processing Industry, Aug. 27-30, 2013, Centro De Convencoes De Pernambuco, Recife, Olinda, Brazil [Viewed on the internet on Jul. 1, 2015]. <URL: http://www.brazilianplastics.com/edicao00/wr07_march_30_2013.html.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Producs, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.

(56) References Cited

OTHER PUBLICATIONS

Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders" published by Maguire Products, Inc., 1995.
Forty-four page two-sided color brochure including cover and back pages entitled "Maguire: Auxiliary equipment for the plastics industry" Maguire Products, Inc., Oct. 2000.
Two-sided color brochure entitled "Convey, Blend, Dry" published by Novatec, Inc., undated.
International Search Report for related application No. PCT/US2015/028472.
Written Opinion of the International Searching Authority dated Jul. 15, 2015 for International Patent Application No. PCT/US2015/028472.

* cited by examiner

METHOD AND APPARATUS FOR VACUUM DRYING GRANULAR RESIN MATERIAL

CROSS-REFERENCE TO RELATED PATENT APPLICATION

This patent application claims the priority under 35 USC 119 and 120 of pending United States provisional application Ser. No. 61/986,266 entitled "Vacuum Dryer for Granular Plastic Resin Material" filed 30 Apr. 2014 in the name of Stephen B. Maguire.

DESCRIPTION OF THE PRIOR ART

Vacuum dryers for drying granular plastic resin material, prior to that material being molded or extruded into a finished product, are known. One commercially successful vacuum dryer, as disclosed in U.S. Pat. No. 6,154,980, uses a powered, rotating carousel to move granular plastic resin material among three stations, at which the granular plastic resin material is heated, dried by vacuum, and stored. Another approach to vacuum drying of granular plastic resin material is disclosed and claimed in U.S. Pat. No. 8,776,392.

SUMMARY OF THE INVENTION

This invention uses gravity to move granular plastic resin material in a vacuum dryer. The granular plastic resin material preferably is heated in a top heating hopper. The granular plastic resin material is then preferably dropped into a vacuum chamber. From the vacuum chamber the granular plastic resin material is preferably dropped into a retention hopper.

A plastic product manufacturing process, either molding or extrusion, can preferably draw dry granular plastic resin material from the retention chamber as required, while the heating hopper and the vacuum chamber preferably continuously prepare subsequent batches of granular plastic resin material. The preferable straight down processing and drying of granular plastic resin material results in a much lower cost dry granular plastic resin material as compared to granular plastic resin material dried using known vacuum dryers.

In a preferred embodiment of this invention, preferably at least one slide gate allows and blocks granular plastic resin material downward flow from part of the dryer to another. Costs are reduced by about forty percent and drying capacity is actually higher in the advantageously small footprint dryer embodying this invention. The small footprint afforded by the vertical, "stacked" configuration of this dryer is advantageous in that space in a plastic manufacturing processing plant, whether an extrusion operation or a molding operation, is often at a premium.

The vacuum chamber of the granular plastic resin material dryer is preferably closed with at least one slide gate having a vacuum tight seal. The slide gate preferably closes and seals against an o-ring to provide a vacuum tight seal. Use of the slide gate avoids vacuum leakage that could occur from the contamination that is present everywhere in a plastic molding or extrusion facility. With the slide gate, plastic dust, flakes, and pellets of granular plastic resin material do not interfere with the vacuum tight seal.

The invention introduces dry air into the vacuum chamber periodically. As moisture is released from the granular plastic resin material while under vacuum, a vacuum pump preferably continues to pull the resulting air-water vapor mixture from the vacuum chamber. Over several minutes, this mixture changes to become a very high percentage of water vapor relative to the air remaining in the chamber.

If the moisture in the form of water vapor is not purged, when vacuum is released from the vacuum chamber, the resulting "thin" but moisture-laden air would reenter the pellets of granular plastic resin material resident within the chamber and reverse the effect of the drying that has occurred. To prevent this, the invention preferably purges the vacuum chamber of moisture several times while vacuum is present. The invention preferably permits very dry purge air to enter the vacuum chamber and then draws the resulting mix of the very dry air and the water vapor-laden air, laden with moisture drawn out of the resin pellets, out of the chamber.

When drying polyethyleneterephthalate ("PET"), used conventionally for beverage bottles, it is essential that moist ambient air not enter the vacuum chamber at the end of a vacuum cycle. The dry air purge allows effective drying of PET pellets.

To supply such dry purge air, the invention preferably uses a separate dry air source. Suitable dry air can be obtained in several ways. Desirably in the practice of the invention in the preferred manner, the invention utilizes compressed air, which passes through at least one oil separator coalescing filter and a compressed air membrane dryer so that the air exiting the oil separator coalescing filter and the compressed air membrane dryer is extremely dry. This dry air is desirably heated to a desired level for introduction into the vacuum chamber. Since only a relatively small amount of dry air is required for purging the vacuum chamber, the compressed air membrane dryer can be very small and of very low capacity.

In the invention, the hopper in which the granular plastic resin material is initially heated is preferably designed such that hot air enters the bottom of the hopper, passes upwardly through the granular plastic resin material resident in the hopper, and exits the hopper at the top. As the hot air is passing through the heating hopper, granular plastic resin material may be dropped from the bottom of the hopper into the vacuum chamber, while new granular plastic resin material is added at the top of the hopper. The heating hopper preferably holds sufficient granular plastic resin material to provide from three to five hours of residence time for the granular plastic resin material before exiting the bottom of the heating hopper. In this way, the granular plastic resin material is exposed to hot, dry air for from three to five hours, which is the time required for the granular plastic resin material to flow downwardly through the heating hopper.

The invention does not dry the granular plastic resin material using "hot" air in the conventional sense. Hot air is used only to bring the granular plastic resin material up to a desired temperature. By carefully controlling the speed of a blower that moves the hot air, air flow is adjusted so that the invention provides the hot air at the correct rate to heat the granular plastic resin material. Viewed differently, most of the useful heat, in terms of calories or BTUs, is removed from the hot or "heating" air before the heating air arrives at the upper surface of the granular plastic resin material in the heating chamber and is allowed to escape.

In the instant invention, since the invention is not concerned with heating during the drying stage, the drying stage, namely the stage during which the pellets are exposed to vacuum in the vacuum chamber, is as short as possible, and may be as little as fifteen or twenty minutes, as contrasted to three to five hours in a conventional desiccant dryer. There is no air filter for the heating air in the invention. The heating air is used only once and is vented to the atmosphere after it has been used for heating and has given up most of its heat. The hearing air is not recirculated.

The single pass flow of heating air and the elimination of the need for a filter for the heating air is unique to this invention. Earlier vacuum dryer designs involved recirculation of air with filtering being required. This invention eliminates the need for a filter by having the "heating" air pass through the granular plastic resin material only once. The invention further regulates the speed of the blower forcing the air through the material to avoid, to the extent possible, loss of unused, residual heat remaining in the "heating" air leaving the heating hopper 56. Blower speed is adjusted so that only enough heated air, at a desired temperature for the resin material prior to drying, is fed to the heating hopper at the bottom so that the bottom potion of resin in the heating hopper reaches the desired final temperature to meet the appetite of the process machine, namely the molding machine or extruder, for dry granular plastic resin material to be molded or extruded.

In one of its aspects, this invention provides a method for drying granular resin material prior to processing of the granular resin material by molding or extrusion that includes heating granular resin material in a heating hopper, monitoring air temperature at the top of the heating hopper, and regulating introduction of heat to the hopper bottom based on monitored air temperature at the top of the heating hopper.

The method may further proceed by releasing heated granular resin material from the heating hopper for flow downwardly into a vacuum chamber while replenishing the heating hopper from above with fresh resin material, preferably in an amount substantially equal to that released into the vacuum chamber. The method preferably proceeds by drawing vacuum in the vacuum chamber, periodically purging the vacuum chamber interior with dry air while the chamber is under vacuum, draining resin material from the vacuum chamber into a retention hopper, and blanketing dried resin material in the retention hopper with dry air so long as the material is resident therein.

Heating the granular resin material preferably further includes introducing dry heating air into the heating hopper at the heating hopper bottom.

In another aspect of the invention, there is provided an improved method for drying granular resin material prior to processing thereof by molding or extrusion by loading granular resin material into a heating hopper from above the hopper, introducing heated air into the hopper at the hopper bottom, monitoring the temperature of the air leaving the hopper at a position above the resin material, and regulating the rate of heated air introduction into the hopper so that monitored temperature of air leaving the hopper does not exceed a preselected level.

In still another one of its aspects, this invention provides apparatus for drying granular resin material prior to molding or extrusion processing of the material. Desirably the apparatus includes a heating hopper, a vacuum chamber positioned below the heating hopper, and a retention hopper positioned below the vacuum chamber. A blower is provided for pumping heating air upwardly through the retention hopper.

DESCRIPTION OF THE INVENTION

Figure 1:
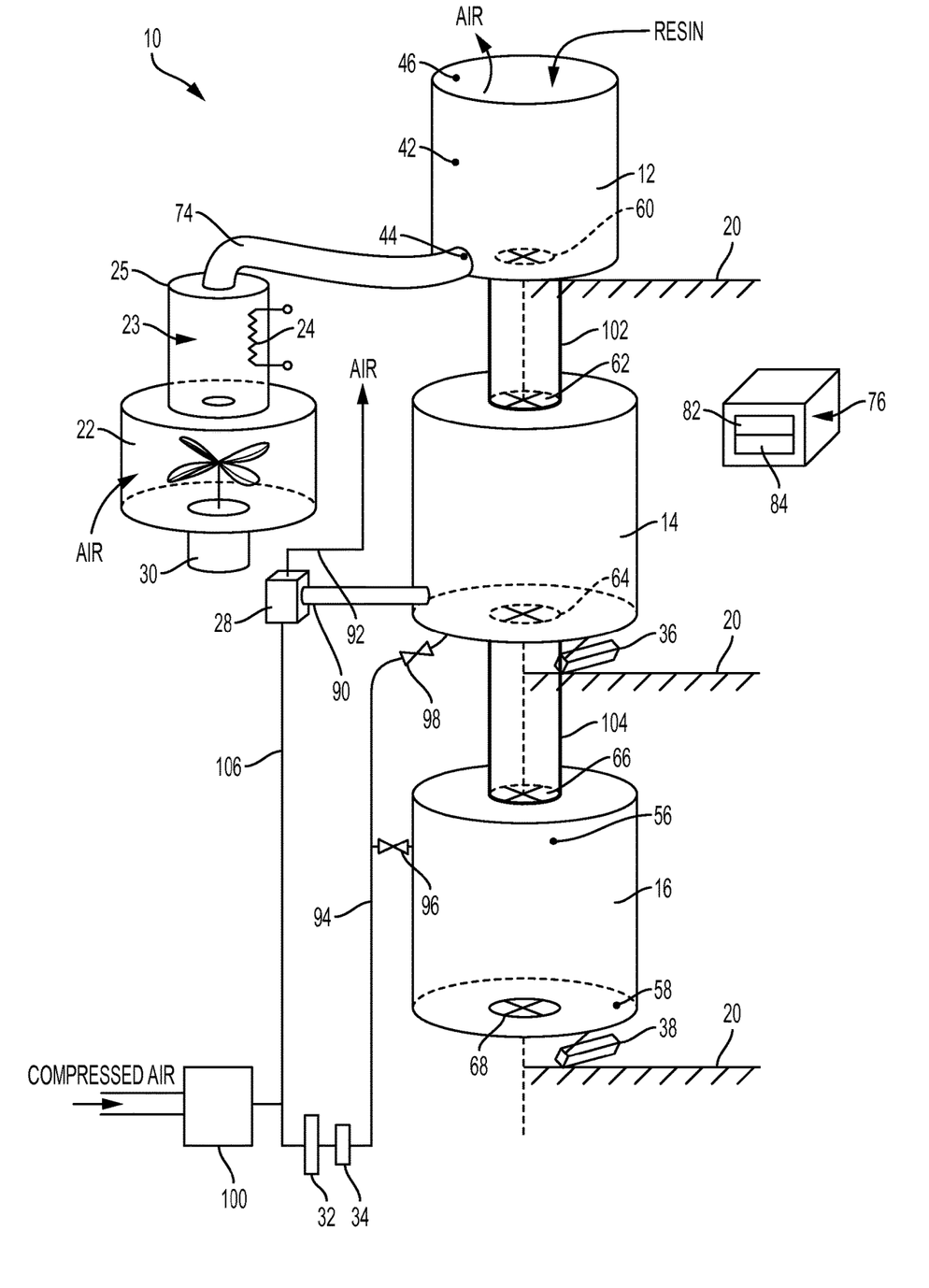
FIG. 1 is a schematic representation of an air purge dryer manifesting aspects of the apparatus and method portions of this invention.

Referring to FIG. 1, an air purge dryer in accordance with the invention is disclosed and designated generally 10. Air purge dryer 10 includes a heating hopper 12, a vacuum chamber 14, and a retention hopper 16, with the heating hopper being positioned above the vacuum chamber and the vacuum chamber in turn being positioned above the retention hopper 16, with the heating hopper 12, vacuum chamber 14, and retention hopper 16 being desirably vertically aligned, as shown in FIG. 1.

Heating hopper 12, vacuum chamber 14, and retention hopper 16 are all preferably independently supported by a support frame designated 20 and shown only schematically in FIG. 1. Specifically, heating hopper 12 does not rest on vacuum chamber 14. To the contrary, support frame 20 supports heating hopper 12 above vacuum chamber 14 so that none of the weight of heating hopper 12 or any resin contained within heating hopper 12 is supported by vacuum chamber 14. Heating hopper 12 is desirably an insulated stainless steel hopper and can accommodate drying temperatures of up to 350° F. The requested heating temperature is adjusted or set on a control panel portion of controller 76.

Similarly, vacuum chamber 14 is independently supported by support frame 20 so that none of the weight of vacuum chamber 14 is transferred to or borne by retention hopper 16. While support frame 20 has been depicted in FIG. 1 in three sections, it is to be understood that support frame 20 can be a single structural member so long as support frame 20 provides separate weight-bearing support for heating hopper 12, vacuum chamber 14, and retention hopper 16. While the support frame 20 has been illustrated in the drawing for vacuum chamber 14, vacuum chamber 14 may also desirably be suspended from above by a suitable frame member similar to schematic frame 20 in the drawing.

The vertically aligned "stacked" arrangement of heating hopper 12, vacuum chamber 14, and retention hopper 16, as depicted generally in FIG. 1, permits gravity-induced flow of granular plastic resin from heating hopper 12 downwardly into vacuum chamber 14, and from vacuum chamber 14 downwardly into retention hopper 16. Desirably, retention hopper 16 is supported by support frame 20 in a manner that retention hopper 16 is somewhat above floor level in the facility in which air purge dryer 10 is located. Having retention hopper 16 above the floor permits dried granular resin material to be supplied directly out of retention hopper 16 by gravity flow to a process machine such as a molding press or an extruder, or to a vacuum-powered resin distribution system within the processing facility. Support frame 20 has been illustrated in schematic form as supporting retention hopper 16, vacuum chamber 14 and heating hopper 12; desirably in addition to vacuum chamber 14 being mountable on rails and in a suspended disposition from support frame 20, heating hopper 12 and retention hopper 16 may both also be mounted on rails to facilitate removal of heating hopper 12 and retention hopper 16 as needed for maintenance, etc.

Air for heating granular plastic resin within heating hopper 12 is supplied by a centrifugal blower 22 that draws in ambient air and forces that ambient air through an air heating chamber 23, which preferably includes a heating element 24 positioned within an open ended cylindrical housing 25. The open ended cylindrical housing 25 is preferably a 6 inch diameter, 6 inch length stainless steel cylinder having suitable insulative material around the exterior thereof. Voltage applied to heating element 24 within cylindrical housing 25 causes heating element 24 to rise in temperature. Air passing along heating element 24, as blown through air heating chamber 23 by centrifugal blower 22, is heated by heating element 24 and exits air heating chamber 23 at the top of chamber 23 and travels via a hot air conduit 74 to heating hopper 12, where the hot air enters heating hopper 12 at the bottom thereof for upward passage through granular plastic resin residing in heating hopper 12. A variable frequency drive 30 is provided for centrifugal blower 22 to modulate the speed of blower 22 and thereby control and adjust the amount of heating air, and therefore the amount of heat, that is introduced into heating hopper 12.

Vacuum chamber 14 is mounted on support frame 20 with one or more load cells 36 between vacuum chamber 14 and support frame 20. Load cell 36 provides data to controller 76 as to the weight of vacuum chamber 20 and any granular plastic resin material being dried therein.

Similarly, retention hopper 16 is mounted on support frame 20 using one or more load cells 38 to provide data to controller 76 as to the weight of dried granular plastic resin material resident within retention hopper 38.

Temperature sensors are provided to monitor air temperature at the inlet connecting conduit 74 to heating hopper 12 and at the top of heating hopper 12, where the heated air, having given up most of its heat, is exhausted. The temperature sensor at the hot air inlet to heating hopper 12 is designated 44 in the drawings, while the temperature sensor at the outlet, at the top of heating hopper 12 where heated ambient air is exhausted, is designated 46.

A material level sensor 42 is provided in heating hopper 12. Level sensor 42 provides a signal indicating excessively low level of material in heating hopper 12. Controller 76 receives a signal from heating hopper level sensor 42 and in response to a low material level signal, controller 76 either actuates apparatus to provide granular resin material for replenishing heating hopper 12 or if no material is available, controller 76 shuts down the air purge dryer 10.

A temperature sensor 56 within retention hopper 16 senses the temperature of the dry purge air with which dried granular resin in retention hopper 16 is blanketed. A granular resin material temperature sensor 58 may be provided at the bottom, close to the material outlet from retention hopper 16, to sense the temperature of the resin material being supplied from retention hopper 16.

Controller 76 desirably has two display screens. The upper screen 82, which desirably has a red background, shows actual temperatures and set point temperatures. The lower screen 84, which desirably has a blue background, shows various running mode information, set up information, and dryer configuration information, as selected by the operator by touch controls that are a part of controller 76 and are associated with the two screens.

One or more oil separator coalescing filters 32 are provided to remove entrained oil and some moisture from the compressed air supply. A compressed air membrane dryer 34 further dries the air and provides very dry purge air for vacuum chamber 14 and a dry air blanket for maintenance of dry conditions for granular resin material in retention hopper 16.

As operation of the air purge dryer begins, material in heating hopper 12 is brought up to temperature. The time for preheating is determined by a specified preheat time, which may be entered by an operator into controller 76, or by an automatic set-up option in controller 76 which establishes an inlet-to-outlet temperature difference for the air input to and exhausted by heating hopper 12, and a minimum preheat time. Once resin material in heating hopper 12 is up to temperature, as determined by the inlet-to-outlet temperature difference as measured by temperature sensors 44 and 46, and the temperature difference is supplied to controller 76, approximately one-third of the resin material in heating hopper 12 is dispensed into vacuum chamber 14. Once this occurs, a first vacuum cycle begins. Each vacuum cycle, namely the time a batch of resin material remains in vacuum chamber 14 under vacuum, has a minimum time that the material is under vacuum. This time may be set by an operator using the inputs available on controller 76 or a default time of 20 minutes may be used.

During normal operation, vacuum in vacuum chamber 14 is brought to a level of about 700 mm Hg and held to about a plus or minus 20 mm Hg differential for the vacuum cycle time. A typical vacuum cycle lasts from 15 to 20 minutes, depending on the material being dried.

As vacuum chamber 14 receives the heated granular resin material through first conduit 102 through operation of material flow control gates 60 and 62 and the vacuum cycle begins, a suitable loader, either human or mechanical, loads heating hopper 12 with new replenishment material, desirably concurrently with the start of the vacuum cycle. Granular resin material loaded into heating hopper 12 remains in heating hopper 12 for a minimum of the time for a vacuum cycle in vacuum chamber 14. After a vacuum cycle in vacuum chamber 14, granular resin material that has been dried in vacuum chamber 14 is dispensed downwardly through second conduit 104, via operation of material flow control gates 64 and 66, into retention hopper 16 and is ready for use. Dried granular resin material residing in retention hopper 16 and not immediately removed therefrom for molding or extrusion is blanketed with dry air so long as that granular resin material remains in retention hopper 16. The dry air blanketing the dried granular resin material remaining in retention hopper 16 is maintained under positive pressure and is desirably slightly heated so as to be warm.

The rate of consumption of dried granular resin material from retention hopper 16 dictates the time granular resin material will be heated in heating hopper 12 and dried under vacuum in vacuum chamber 14. For example, if thirty (30) minutes are required to deplete retention hopper 16, the vacuum cycle in vacuum chamber 14 will run past the normal twenty (20) minute set point and will last thirty (30) minutes. This is normal operation and does not in any way degrade the granular plastic resin that has been dried in vacuum chamber 14. However, if retention hopper 16 is depleted in fifteen (15) minutes and the time for a vacuum cycle in vacuum chamber 14 has been set to twenty (20) minutes, a five (5) minute window will result when no granular resin material is available. This indicates that the throughput capacity of the dryer has been exceeded for the particular granular resin material being dried. Upon such occurrence, controller 76 senses that retention hopper 16 is empty, that vacuum chamber 14 is still drying material, and with no material being available in retention hopper 16, controller 76 sounds an alarm.

Vacuum chamber load cell(s) 36 and retention hopper load cell(s) 38 allow controller 76 to always have in memory the current weight of material in the vacuum chamber and the current weight of material in the retention hopper. This permits calculation by controller 76 of throughput of granular resin material in pounds of resin material per hour.

Venturi vacuum generator 28 requires an operating air pressure of about 80 psi. The pressurized air is desirably supplied by an in-house air system.

A purge air inlet temperature sensor 56 is provided in retention hopper 16. A granular resin material outlet temperature sensor 58 is provided at the bottom of retention hopper 16. Both sensor 56 and sensor 58 provide temperature data to controller 76.

The desired temperature of air being outlet from the top of heating hopper 12 may be set in controller 76 such that once the temperature of air escaping from the top of heating hopper 12 reaches a desired level, centrifugal blower 22 and heating element 24 will shut down for a predetermined time period specified by an operator and programmed into controller 76 or until a vacuum cycle, which is under way, ends, whichever event comes first.

The fill and the fill rate for vacuum chamber 14 are controlled and may be adjusted by material flow control gates 60 and 62 above vacuum chamber 14 as actuated and controlled by controller 76. Similarly, material dump and material dump rate from vacuum chamber 14 can be controlled and adjusted by material flow control gates 64 and 66 below vacuum chamber 14 as actuated and controlled by controller 76. These parameters, namely vacuum chamber fill and fill rate and vacuum chamber dump and dump rate are programmable into controller 76. Similarly, the timing by which dry purge air is introduced into vacuum chamber 14 is desirably adjusted and controlled by controller 76. Typically during a twenty (20) minute vacuum cycle, purge air will be introduced into vacuum chamber 14 six (6) times.

Controller 76 controls and allows adjustment to the heat output provided to heating hopper 12. While the vacuum dryer of the invention produces dried material in batches, the dryer is a continuous supplier of suitably dry material for molding or extrusion. Dry material may be withdrawn from retention hopper 16 on a continuous basis. Vacuum chamber 14 processes one batch of material every 20 minutes, which is sufficient to keep retention hopper 16 and any process machine being fed by retention hopper 16 supplied on a continuous basis.

The vacuum dryer of the invention uses fresh air without recycling any air in the dryer. The air coming into the dryer is used once and goes out of the dryer; there is no recycling of air.

The load cells, together with controller 76, facilitates tracking throughput of granular resin material by the vacuum dryer of the invention, permitting optimization of manufacturing parameters in the plastic molding or extrusion facility in which the dryer of the invention is located.

During the course of operation of the invention, vacuum is drawn by Venturi vacuum generator 28 from vacuum chamber 14 via vacuum drawing conduit 90.

Incoming compressed air from the plastics molding or extrusion facility is supplied to pressure regulator 100 as indicated in the drawing. This regulated pressurized air, with pressure regulated to a required level, is then supplied via regulated pressure air line 106, which splits as illustrated in FIG. 1 with one portion of line 106 leading to oil separating coalescing filter 32 and the other portion of line 106 leading to Venturi vacuum generator 28. An exhaust line 92 leads from Venturi vacuum generator 28 to ambient air.

Purge air is provided via purge air supply line 94 which exits compressed air membrane dryer 34 and supplies purge air in very dry form after exiting dryer 34 to both retention hopper 16 and to vacuum chamber 14. Introduction of purge air to retention hopper 16 is controlled by valve 96, which in turn is actuated by controller 76. Introduction of purge air to vacuum chamber 14 is controlled by vacuum chamber purge air valve 98, which in turn is also controlled by controller 76. The wiring for connection of valves 96, 98 and the other components to controller 76 is not illustrated in the drawing to enhance the drawing clarity.

Flow of granular plastic resin material downwardly from heating hopper 12 to vacuum chamber 14 is desirably through a first conduit 102. Flow of dried granular resin material from vacuum chamber 14 to retention hopper 16 is desirably through a second conduit 104. Conduits 102, 104 are respectively mechanically connected, preferably substantially air tightly, respectively to heating hopper 12, vacuum chamber 12 and retention hopper 16.

Gates 60, 62, 64, and 66 have been illustrated positioned respectively in the bottom of heating hopper 60, at the top and at the bottom of vacuum chamber 14, and at the top of retention hopper 16. These gates may desirably be positioned in respective first and second conduits 102, 104 according to the manner of selected construction for the flow through vacuum dryer.

It is desirable to have two gates, such as gates 60, 62, above vacuum chamber 14 to control downward flow of resin from heating hopper 12, with an upper gate 60 providing gross, course control and a lower gate 62 providing air tight vacuum sealing of the vacuum chamber. Use of the two gates, 60, 62, with course control afforded by upper gate 60, minimizes the possibility of resin material becoming stuck in gate 62 and thereby precluding gate 62 from making the vacuum tight seal required for effective operation of vacuum chamber 14 during the drying phase. Desirably, gate 62 is a slide gate providing vacuum tight seal using a rubber gasket with the movable slide portion of the gate closing against the rubber gasket and moving first in a direction laterally across with respect to the direction of downward flow of resin and then vertically parallel with the direction of downward flow of resin, with such horizontal and then vertical movement of the gate effectuated by the shape of the slot in which the slide gate moves.

Material gate 64 may similarly be a slide gate or may be a pivoting gasket-equipped gate actuated by an air cylinder with the gate pivoting downwardly to effectuate downward flow of dried plastic resin material out of vacuum chamber 14 upon the conclusion of the vacuum cycle. Use of a pivoting-type gate at gate 64 reduces cost over the cost of a slide gate since gravity will carry any residual granules of plastic resin material downwardly through second conduit 104 into retention hopper 16. Gates 60 and 66 may be of any suitable type, desirably actuated by air cylinders controlled by controller 76.

All components illustrated in FIG. 1 are controlled by controller 76. This includes the drive 30 for centrifugal blower 22, heating element 23, the various gates that control the flow of resin downwardly through the dryer, the load cells that detect weight thereby allowing the computation of amount of material flowthrough, and the like. Controller 76 controls all aspects of the operation of the dryer and once the dryer is started, human intervention is not necessary. Of course, controls provided on controller 76 allow human intervention if desired.

I claim the following:

1. In a method for drying granular resin material prior to processing thereof by molding or extrusion including the steps of heating granular resin material in a heating hopper by application of heating air thereto, releasing heated granular resin material from the heating hopper for flow downwardly into a vacuum chamber, and drawing vacuum in the vacuum chamber to dry granular resin material resident therein, the improvement comprising:

a) monitoring the temperature of heated air released to ambient at the top of the heating hopper;

b) simultaneously regulating heat input to the heating hopper, so that monitored air temperature of air released to ambient at the top of the heating hopper does not exceed a preselected temperature, and periodically purging the vacuum chamber with dry air while the vacuum chamber contains granular resin material under vacuum;

c) draining dried granular resin material from the vacuum chamber past a vacuum sealing slide gate into a retention hopper; and d) dynamically blanketing dried granular resin material in the retention hopper with dry air.

2. A method for drying granular resin material prior to processing thereof by molding or extrusion, comprising:

a) heating granular material in a heating hopper by introduction of heated ambient air at a bottom portion of the heating hopper;

b) monitoring air temperature at the top of the heating hopper;

c) regulating heat input to the heating hopper from the heated ambient air by regulating speed of air passing through a cylindrical heater so that monitored air temperature escaping to ambient at the top of the heating hopper does not exceed a preselected temperature;

d) releasing heated granular material from the heating hopper for flow downwardly into a vacuum chamber and replenishing the heating hopper from above with fresh granular resin material in an amount substantially equal to that released into the vacuum chamber;

e) drawing vacuum in the vacuum chamber to dry granular resin material therein while periodically purging the vacuum chamber with dry air having first passed along a membrane dryer by introducing the dry air into the bottom of the vacuum chamber;

f) draining granular resin material from the vacuum chamber into a retention hopper; and g) continuously blanketing granular resin material in the retention hopper with dry air.

3. Apparatus for drying granular resin material prior to molding or extrusion processing thereof, comprising:

a) a stationary heating hopper having an air outlet to ambient at the top;

b) a stationary vacuum chamber spaced apart from and positioned below the heating hopper;

c) a stationary retention hopper spaced apart from and positioned below the vacuum chamber;

d) an adjustable blower having a variable frequency drive for blowing heated ambient air ;

e) a heating conduit connecting the blower with the heating hopper at the heating hopper bottom, the heating conduit having a heater for heating ambient air therewithin prior to introduction into the heating hopper, the heater comprising a hollow cylindrical housing disposed for flow therethrough of air to being heated and an electrical heating element within the housing;

f) a first drying conduit for periodically introducing dry purge air into the vacuum chamber while granular resin material is being dried therein under vacuum;

g) a second drying conduit for periodically introducing blanketing dry air into the retention hopper;

h) a sensor for detecting temperature of heated air released to ambient at the top of the heating hopper; and i) a control for adjusting speed of the blower in response to the detected air temperature.

4. Apparatus of claim 3 wherein the housing is metal.

5. Apparatus of claim 3 further comprising:

a) a first vacuum sealing gate between the heating hopper and the vacuum chamber, movable horizontally perpendicular to the direction of granular material downward flow between open and closed positions, for controlling downward granular material flow from the heating hopper into the vacuum chamber;

b) a second vacuum sealing gate between the vacuum chamber and the retention hopper, movable horizontally perpendicular to the direction of granular material downward flow between open and closed positions, for controlling downward granular material flow from the vacuum chamber into the retention hopper.

6. Apparatus of claim 3 further comprising:

a) a plurality of first vacuum gates between the heating hopper and the vacuum chamber, movable between open and closed positions, for controlling downward granular material flow from the heating hopper into the vacuum chamber;

b) a plurality of second vacuum gates between the vacuum chamber and the retention hopper, movable between open and closed positions, for controlling downward granular material flow from the vacuum chamber into the retention hopper.

7. Apparatus of claim 5 wherein the first and second vacuum sealing gates are connected to the vacuum chamber.

8. Apparatus of claim 7 wherein the first and second vacuum sealing gates are slide gates.

9. Apparatus of claim 3 further comprising:

a) a first support bearing the weight of the heating hopper;

b) a second support bearing the weight of the vacuum chamber;

c) a third support bearing the weight of the retention hopper; and d) a sensor connected to the second support for sensing weight of the vacuum chamber and any granular material therein.

10. Apparatus of claim 9 further comprising:

a) a sensor connected to the third support bearing, for sensing weight of the retention hopper and any granular material therein.

11. Apparatus of claim 10 wherein the sensors are load cells.

12. A method for drying granular resin material prior to processing thereof by molding or extrusion, comprising:

a) heating granular material in a stationary heating hopper by introduction of heated air at the hopper bottom, the air being heated by blower-forced passage through a heater comprising a cylindrical housing having an electrical heating element within the housing, the heated air being released to ambient at the hopper top;

b) monitoring heated air temperature as the heated air is released to ambient at the top of the heating hopper;

c) controlling heat input to the heating hopper supplied by the heated ambient air by regulating the speed at which air passes through the heater, so that monitored air temperature at the top of the heating hopper does not exceed a preselected temperature;

d) releasing heated granular resin material from the heating hopper for flow downwardly into a vacuum chamber and replenishing the heating hopper from above with fresh granular resin material in an amount substantially equal to that released into the vacuum chamber;

e) drawing vacuum in the vacuum chamber to dry the heated granular resin material therein while periodically purging the vacuum chamber with dry air;

f) draining dried granular resin material from the vacuum chamber into a retention hopper;

g) continuously blanketing dried granular resin material in the retention hopper with dry air.

13. The method of claim 12 wherein regulating heat input to the heating hopper further comprises regulating speed of air passing through the heater.

14. The method of claim 12 wherein purging the vacuum chamber with dry air further comprises:
   a) passing compressed air along a membrane dryer;
   b) introducing the dried compressed air into the vacuum chamber at the bottom of the chamber.

15. Apparatus for drying granular resin material prior to molding or extrusion processing thereof, comprising:
   a) a heating hopper;
   b) a vacuum chamber positioned below the heating hopper;
   c) a retention hopper positioned below the vacuum chamber;
   d) a blower having a variable frequency drive for supplying heated ambient air for upward flow through the heating hopper;
   e) a heating conduit connecting the blower with the heating hopper at the heating hopper bottom, the heating conduit having a heater for heating ambient air therewithin prior to introduction into the heating hopper, the heater comprising a hollow metallic cylindrical housing disposed for air flow therethrough and an electrical heating element connected to the housing;
   f) a first drying conduit for periodically introducing dry purge air into the vacuum chamber at the chamber bottom while granular material is being dried therein under vacuum;
   g) a second drying conduit for periodically introducing blanketing dry air into the retention hopper;
   h) a first gate between the heating hopper and the vacuum chamber, movable perpendicularly to the direction of granular material downward flow between open and closed positions, for controlling downward granular resin material flow from the heating hopper into the vacuum chamber;
   i) a second gate between the vacuum chamber and the retention hopper, movable perpendicularly to the direction of granular material downward flow between open and closed positions, for controlling downward granular resin material flow from the vacuum chamber into the retention hopper;
   j) a load cell connected for sensing weight of the vacuum chamber and any granular resin material therein;
   k) a second load cell for sensing weight of the retention hopper and any granular resin material therein
   l) a material load sensor within the heating hopper providing a signal indicative of granular resin material load weight in the heating hopper; and
   m) a controller connected to the material load weight sensor, receiving the signal therefrom and in response to low granular resin material load weight actuating the apparatus to furnish granular resin material to the heating hopper or if no granular resin material is available shutting down the apparatus.

* * * * *